United States Patent

Bunyan

[11] 4,153,280
[45] May 8, 1979

[54] PIPE COUPLINGS

[75] Inventor: Thomas W. Bunyan, London, England

[73] Assignee: Pilgrim Engineering Developments Limited, London, England

[21] Appl. No.: 771,093

[22] Filed: Feb. 23, 1977

[51] Int. Cl.² ............................................. F16L 21/08
[52] U.S. Cl. .......................................... 285/97; 285/18; 285/93; 285/104; 285/365
[58] Field of Search .................... 285/96, 97, 105, 104; 277/34.3

[56] References Cited

U.S. PATENT DOCUMENTS

| | | | |
|---|---|---|---|
| 2,306,160 | 12/1942 | Freyssinet | 285/97 X |
| 2,389,977 | 11/1945 | Hollerith | 285/97 X |
| 3,023,995 | 3/1962 | Hopkins | 285/97 X |
| 3,337,222 | 8/1967 | Smith et al. | 277/34.3 |
| 3,420,554 | 1/1969 | Straub | 285/97 |
| 3,473,640 | 10/1969 | Schutz | 285/97 X |
| 3,480,043 | 11/1969 | Proudfoot et al. | 285/97 X |
| 3,737,179 | 6/1973 | White, Jr. | 285/96 |
| 3,843,167 | 10/1974 | Gronstedt | 285/105 X |
| 3,860,270 | 1/1975 | Arnold | 285/96 X |

FOREIGN PATENT DOCUMENTS

| | | | |
|---|---|---|---|
| 1037807 | 8/1958 | Fed. Rep. of Germany | 285/96 |
| 1127240 | 8/1956 | France | 227/34.3 |
| 1241634 | 8/1960 | France | 285/97 |
| 466638 | 11/1951 | Italy | 285/294 |
| 53457 | 5/1967 | Poland | 285/97 |
| 556010 | 9/1943 | United Kingdom | 285/97 |
| 1170921 | 11/1969 | United Kingdom. | |
| 1273644 | 5/1972 | United Kingdom. | |
| 1364388 | 8/1974 | United Kingdom. | |
| 1366999 | 9/1974 | United Kingdom. | |
| 1368122 | 9/1974 | United Kingdom. | |
| 1373465 | 11/1974 | United Kingdom. | |
| 1409915 | 10/1975 | United Kingdom. | |

*Primary Examiner*—Thomas F. Callaghan
*Attorney, Agent, or Firm*—Woodcock, Washburn, Kurtz & Mackiewicz

[57] ABSTRACT

A pipe coupling comprising a sleeve which is fitted over the adjacent ends of the pipe sections. The sleeve has sealing means for sealing the sleeve against the pipe and gripping means for gripping the pipe. The sealing means comprises an annular groove which accommodates an annular tire the interior of which communicates with the exterior of the sleeve through a bore in the wall of the sleeve. The gripping means comprises arcuate groove sections on the inside of the sleeve which accommodates a tubular member or members which communicate with the exterior through bores in the wall of the sleeve, and jaw sectors with teeth which bite into the outside of the pipe. The tubular member or members and the annular tire are filled with a hardenable composition and maintained under pressure until set to force the sealing member into sealing contact against the outer surface of the pipe and cause the gripping teeth to bite into the outer surface of the pipe.

6 Claims, 14 Drawing Figures

PIPE COUPLINGS

The present invention relates to a pipe coupling especially a coupling for oil or gas pipelines.

BACKGROUND OF THE INVENTION

In U.S. Pat. No. 3,860,270 there is disclosed a coupling comprising a sleeve for fitting over the end of a pipe. The sleeve has means for sealing the sleeve against the pipe and means for gripping the pipe. The sealing means comprises an annular groove containing a sealing member and a chamber which communicates with the exterior and can be filled with a hardenable composition and maintained under pressure until set to force the sealing member into sealing contact against the outer surface of the pipe. The gripping means comprises annular grooves on the inside of the sleeve which accommodate jaw sectors with gripping teeth, sealing members in the grooves behind the jaw sectors and a chamber which communicates with the exterior and can be filled with a hardenable composition and maintained under pressure until set to cause the gripping teeth of the jaw sectors to bite into the outer surface of the pipe.

The sealing member of the sealing means comprises a sealing ring which forms a seal against the sides of the annular groove and against the pipe and the chamber is formed by the space in the groove behind the sealing ring. Similarly the sealing members of the gripping means comprise sealing rings which form seals against the sides of the annular grooves and the pressure chambers are the spaces in the grooves behind the sealing rings.

The arrangement of U.S. Pat. No. 3,860,270 is considered to be unsatisfactory in that the sealing rings do not provide satisfactory seals for use at high pressures.

It is the object of the present invention to provide a pipe coupling which overcomes the aforementioned disadvantage.

SUMMARY OF THE INVENTION

According to the present invention a pipe coupling comprises a sleeve for fitting over the end of a pipe section, the sleeve having means for sealing the sleeve against the pipe and means for gripping the pipe, the sealing means comprising an annular groove which accommodates an annular tyre the interior of the tire communicating through bores in the wall of the sleeve with the exterior, the gripping means comprising arcuate groove sections on the inside of the sleeve which accommodate jaw sectors with gripping teeth and a tubular member or members located in the groove behind the jaw sectors, the tubular member or members communicating through bores extending through the wall of the sleeve with the exterior, the arrangement being such that the annular tire and the tubular member or members can be filled through the bores with a hardenable composition and maintained under pressure until set to force the sealing member into sealing contact against the outer surface of the pipe and to cause the gripping teeth of the jaw sectors to bite into the outer surface of the pipe.

An advantage of the present invention is that it enables a gripping load that is greater than the strength of the pipe to be achieved. By pressurising the hardenable composition to the working pressure of the pipe, that is the pressure of the fluid in the pipe when the pipe is in use, the compression force on the pipe end will be counterbalanced by the tensile hoop stress caused by the pressure of the fluid in the pipe. In applications where the working pressure is close to the yield strength of the pipe, say 80%, the gripping load will be equal to about 80% of the yield strength when the pipe is not in use and will be doubled to approximately 160% of the yield strength when the pipe is in use.

The sleeve may be provided with second means for sealing the sleeve to a pipe so that a single sleeve may be used to couple two pipe ends together. Alternatively the sleeve may have an external flange at one end so that it can be bolted or clamped to the flange of a similar sleeve attached to the end of another pipe, to form a pipe joint.

Preferably the sealing means include at least two annular grooves, each of which accommodates an annular tyre, the interior of which communicates with the exterior through bores in the wall of the sleeve. A further bore may be provided through the wall of the sleeve between the annular grooves so that the space between the two annular grooves and the sleeve and the pipe end may be pressurised and the pressure monitored to detect leaks in the seals.

The sleeve may be formed as a single piece encircling the pipe in which case the groove sections of the gripping means may be formed by a helical groove and the tubular member may be a single helical tubular member, the interior of which communicates with the exterior of the sleeve through bores at both ends. Alternatively, the sleeve may be formed in two parts separated from one another along a longitudinal plane through the axis of the sleeve. The two parts may be coupled to one another along their longitudinal pair of edges by bolts which pass through flanges along the longitudinal edges. This arrangement may facilitate the placing of the sleeve in position under difficult conditions such as for example when repairing a pipeline on the sea bed.

In the case of a sleeve formed in two parts as described above the groove sections of the gripping means may be in the form of a continuous sinuous groove with groove sections extending from one longitudinal edge to the other, the groove sections being connected alternately at opposite edges by semi-circular sections and the tubular member may be in the form of a separate single tubular member for each part of the sleeve, the interior of the tubular members communicating with the exterior through bores in the wall of the pipe at both ends.

Embodiments of the invention will now be described, by way of example, with reference to the accompanying drawings, of which:

Figure 1:
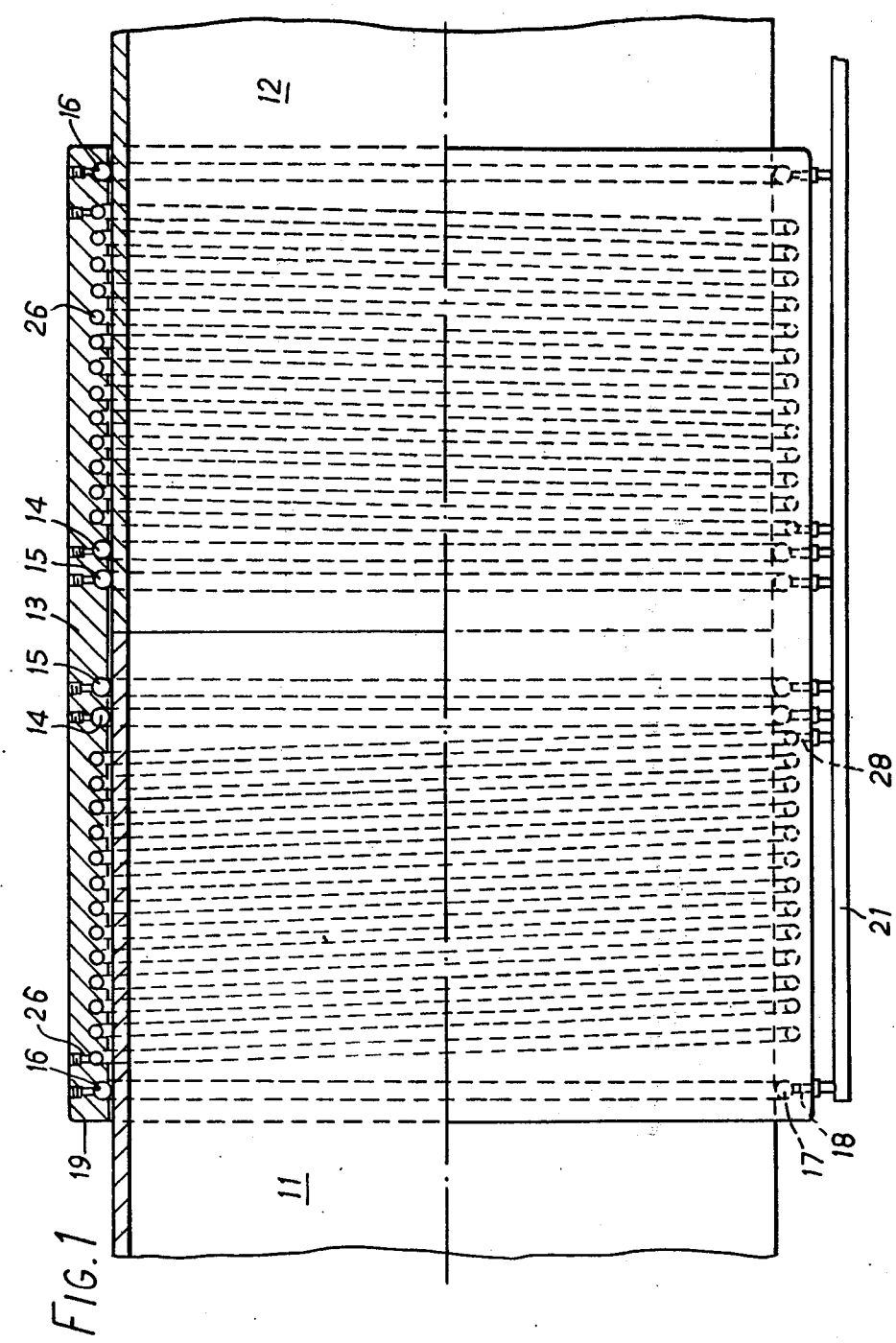
FIG. 1 shows a longitudinal cross-section of a coupling sleeve according to the invention joining two pipe ends.
Figure 3:
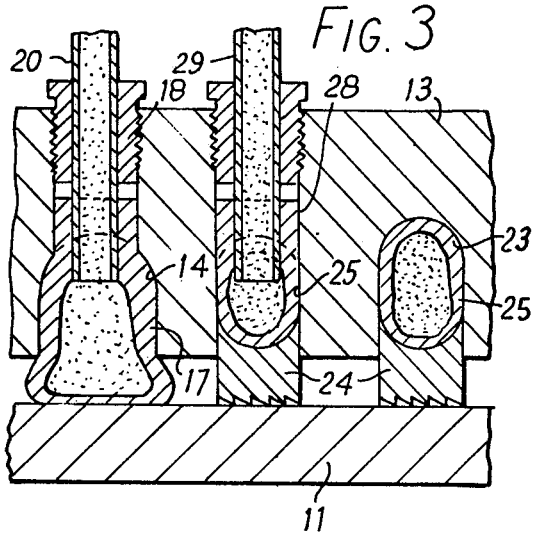
FIG. 3 shows a cross-section on an enlarged scale of the epoxy composition filling connection.

Referring to FIGS. 1, to 3 this shows the ends of two abutting pipes 11 and 12 coupled together by a sleeve of steel. Two pairs of annular grooves 14 and 15 are provided in the inner surface of the sleeve 13 opposite the respective ends of the pipes 11 and 12. Two further annular grooves 16 are provided in the inside surface of the sleeve 13 near the two ends of the sleeve. An annular tyre 17 is accommodated in each of the grooves 14, 15 and 16 and the interior of each tyre communicates with the exterior through two bores 18 and 19 in the wall of the sleeve. The bores 18 at the bottom of the sleeve constitute inlet ports for injection of an epoxy resin composition and are provided with a filling pipe 20 which is connected to a manifold 21. The bores 19 at the top of the sleeve constitute exhaust ports for air and are provided with air bleed valves 22.

In use the tires in the grooves 14, 15 and 16 are filled with epoxy resin through the manifold 21, the filling pipe 20 and the bores 18. The epoxy resin composition fills the tires 17, displacing the air in them and exhausting it from the tires through the air bleed valves 22 in the bores 19. When the epoxy resin reaches the valves 22 they are automatically closed by the epoxy resin and the pressure of the epoxy resin in the tires 17 is raised to the pressure at which it is delivered from the pump (a pressure exceeding 2,000 psi) under the pressure of the resin in the tires 17; the tires which are of nitrile rubber are deformed and pressed tightly against the outside of the pipes 11 and 12 to form a seal. The epoxy resin composition is maintained under pressure until set.

Between the annular grooves 14 and 16 opposite the ends of the pipes 11 and 12 are two helical grooves 23 in the inside surface of the sleeve 13. Many jaw sectors 24 of tough steel are accommodated in the grooves 23. The jaw sectors 24 are a close fit in the grooves and abut against each other with a half millimeter clearance. The jaw sectors have a series of circumferential knife or saw-tooth shaped gripping edges which bite into the outer surface of the pipe. In each groove 23 behind the jaw sectors 24 is a nitrile rubber helical tube 25 which forms a load cell. At the outer end of the helical tube at the top of the sleeve the interior of the tube 25 communicates with the exterior through a bore 26. The bore 26 is fitted with an air bleed valve 27.

At the inner end of the tube 25 at the lower side of the sleeve 13 the interior of the tube communicates with the exterior through a bore 28. The bore is fitted with a filling pipe 29 connected to the manifold 21. The helical tubes 25 are filled with epoxy resin composition in a similar manner to the tires 17. Epoxy resin composition is introduced into the tubes 25 at the lower side of the sleeve and works its way around the helical tube displacing the air in front of it until the epoxy resin reaches the air bleed valve 27. When it reaches the air bleed valve the epoxy resin closes the valve and the epoxy resin in the tube is raised to the pressure at which it is delivered from the pump. The pressure of the epoxy resin causes the tube to expand forcing the jaw sectors 24 to bite into the outer surface of the pipe. The circumferential knife or saw-tooth edges to the jaws grip the pipe. The epoxy resin is maintained under pressure until set so that the gripping load of the jaw sectors 24 against the ends of the pipes 11 and 12 is maintained.

Figure 2:
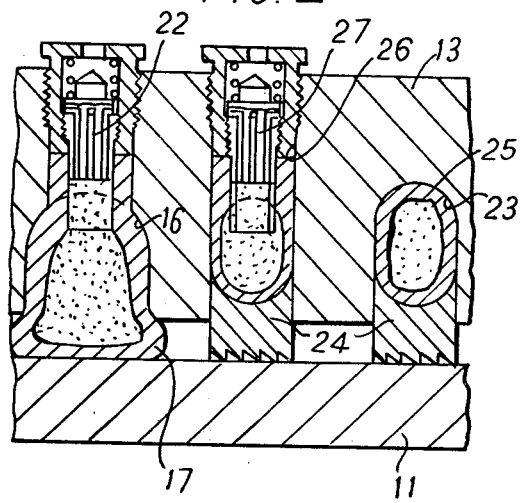
FIG. 2 shows a cross-section on an enlarged scale of the air bleed valves of the coupling of FIG. 1.
Figure 6:
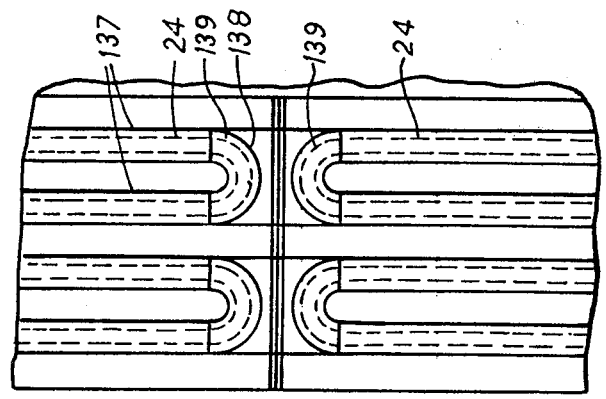
FIG. 6 is a detailed view from the interior of the coupling of FIGS. 4 and 5 on an enlarged scale.
Figure 4:
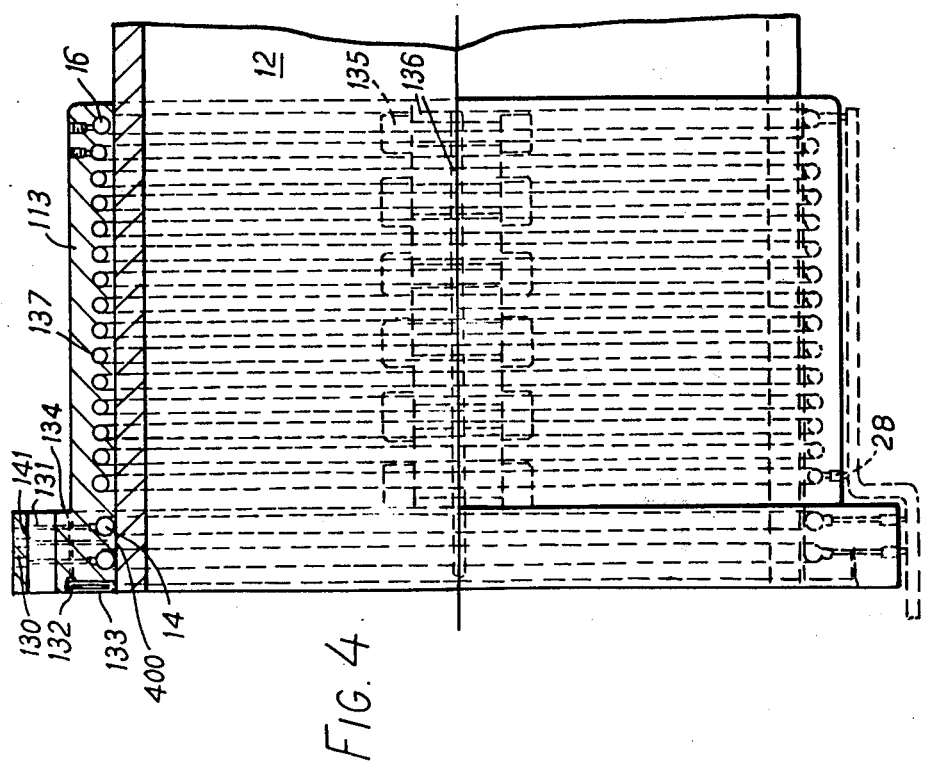
FIG. 4 shows a longitudinal cross-section of a second embodiment of coupling sleeve according to the invention joined to one pipe end.
Figure 5:
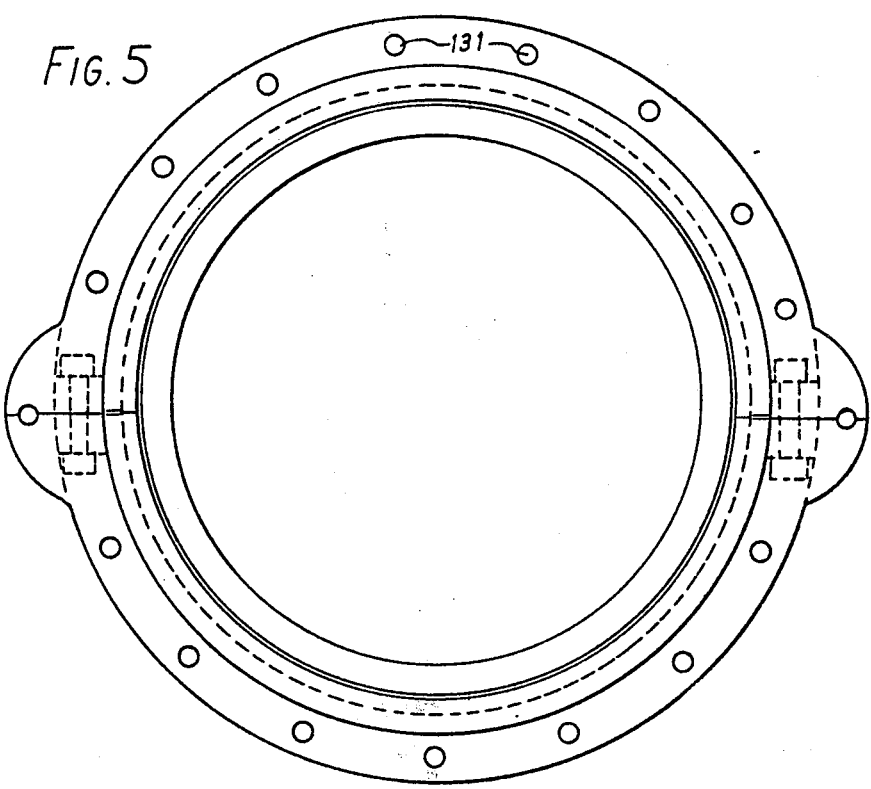
FIG. 5 is an end view of a coupling sleeve of FIG. 4.

Referring to FIGS. 4 to 6 these show a modification of the design of pipe coupling of FIGS. 1 to 3. A coupling sleeve 113 is provided for connecting to one end of one pipe 12 and includes a circumferential outwardly projecting bolting flange 130 for connecting the coupling sleeve 113 to a similar coupling sleeve mounted on the end of another pipe. The coupling flange 130 is provided with bolt holes 131 for receiving the bolts (not shown). A recess 132 in the end face of the sleeve at the end that bears the flange 130 accommodates a nitrile rubber tyre 133. The nitrile rubber tyre 133 communicates through a bore 134 in the flange with the exterior. Once the two similar coupling sleeves have been bolted together by means of their flanges 130 the tyre 133 can be filled with epoxy resin in the usual way and maintained under pressure until set to form a permanent face seal.

The sleeve 113 is divided longitudinally along a plane through the axis of the sleeve. The two halves of the sleeve 113 can be secured together by means of hydraulic jacking bolts 135 which pass through holes in bolting flanges 136.

On the inside of the sleeve 113 are provided annular grooves 14, 15 and 16 with annular tires 17 similar to the grooves and tires of the embodiment of FIG. 1. The area between the grooves 14 and 16 on the inside of the sleeve each sleeve part is provided with a series of semicicular groove sections 137. Adjacent groove sections are joined at alternate ends by semi-circular sections 138. Thus the sections 137 and 138 form in each sleeve part a groove which is continuous from one end to the other. Located in the groove in each sleeve part are arcuate jaw sectors 24. In the groove behind the jaw sectors is a continuous hollow nitrile rubber tube 139 which follow a sinuous path in the groove and communicates with the exterior at opposite ends through bores 26 and 28 fitted with air bleed valves and filling pipes as the bores 26 and 28 of FIGS. 1 to 3.

To form a pipe joint two coupling sleeves 113 are fitted on the ends of the two pipes to be joined, the two parts of each sleeve 113 being bolted together by the bolts 135 and the two flanges 130 being bolted together. The tires 17, the tube 139 and the tire 133 are all filled with epoxy resin composition and maintained under pressure until set. The tires 17 form seals against the pipes, the tube 139 forces the jaw sectors 24 into gripping engagement with the pipes and the tire 133 seals the joint between the two sleeves 113.

Figure 7:
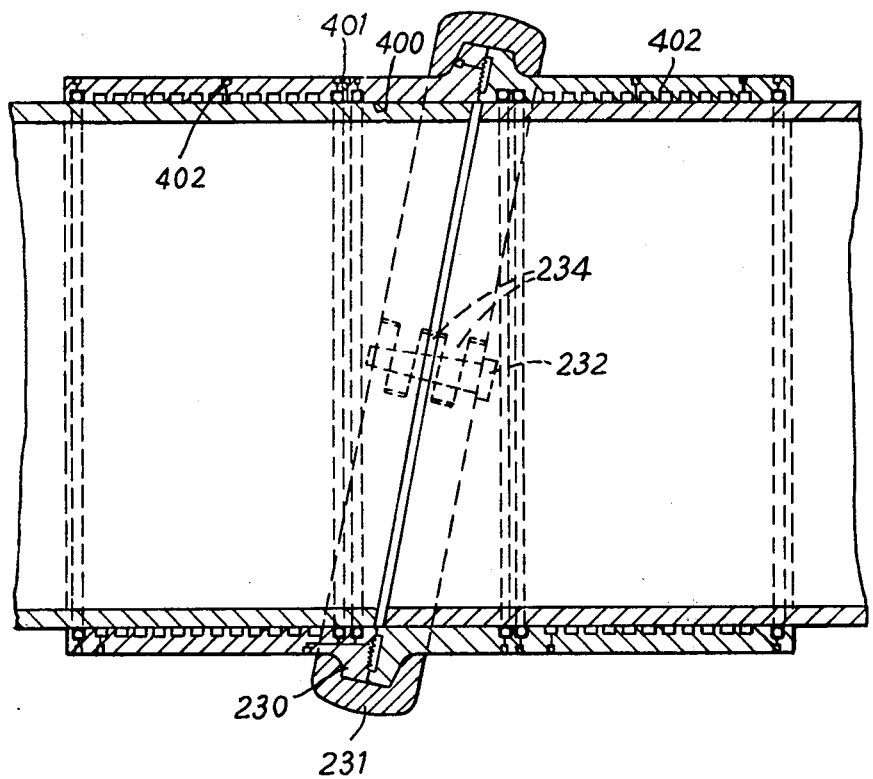
FIG. 7 shows a longitudinal section of a third embodiment of coupling sleeve according to the invention joining two pipe ends.
Figure 8:
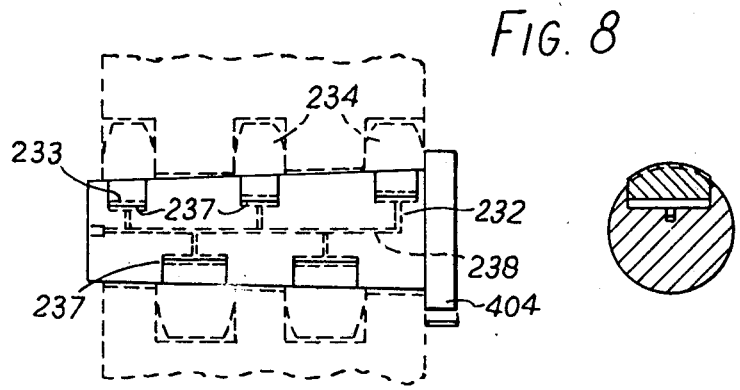
FIG. 8 shows an enlarged detail of a hydraulic valve for holding together the ends of the coupling collar of the coupling sleeve of FIG. 7.

FIGS. 7 and 8 shows another form of pipe coupling which is similar to the arrangement of FIGS. 1 and 4 with regard to the arrangement of sealing ang gripping means but has a joint which is scarfed or inclined to the pipe axis for accessibility and ease of fitting. At least two stub flanges 230 are held together by two hinged segments of a collar 231 which is closed around the flanges 230 and held in the closed position by a tapered plug 232 which is inserted through holes 233 in the two interleaving dogs 234.

Figure 9:
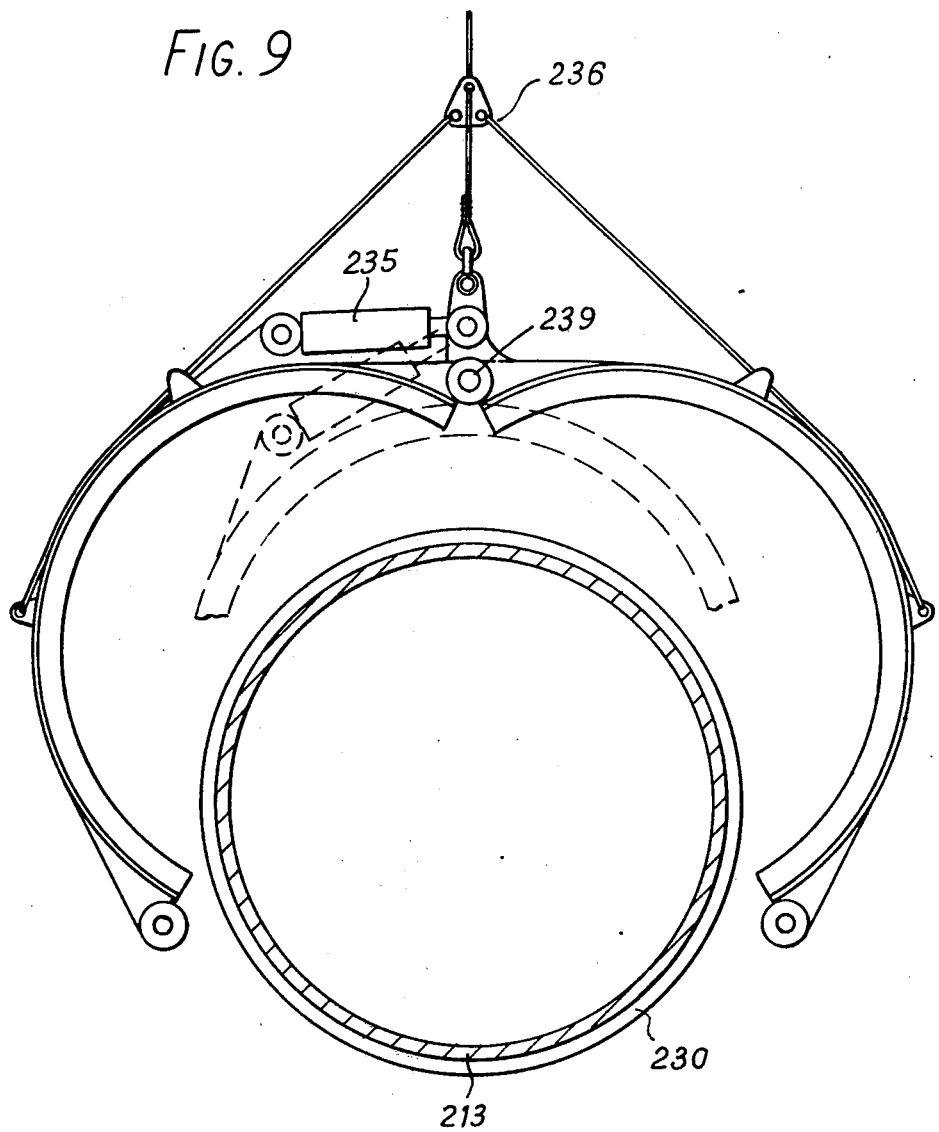
FIG. 9 shows a coupling collar of FIG. 7 being lowered into position.

FIG. 9 shows how the two hinged segments of the collar 231 may be closed around the flanges 230 of the sleeve 213 either by a hydraulic actuator 235 or by gravity using the sling 236.

As can be seen in FIG. 8 the tapered plug 232 includes a number of load cells 237 which are connected together within the pin by bores 238. After the plug 232 has been inserted the load cells may be pressurized using epoxy resin composition at a pressure of 2,000 psi. The load cells act on opposed parts of the interleaved dogs drawing the segments of the collar forcibly together. The hinge pin 239 may be of similar construction to the plug 232 and its load cells may be pressurized in a similar way so as to draw the two halves of the collar together on opposite sides of the sleeve.

Figure 10:
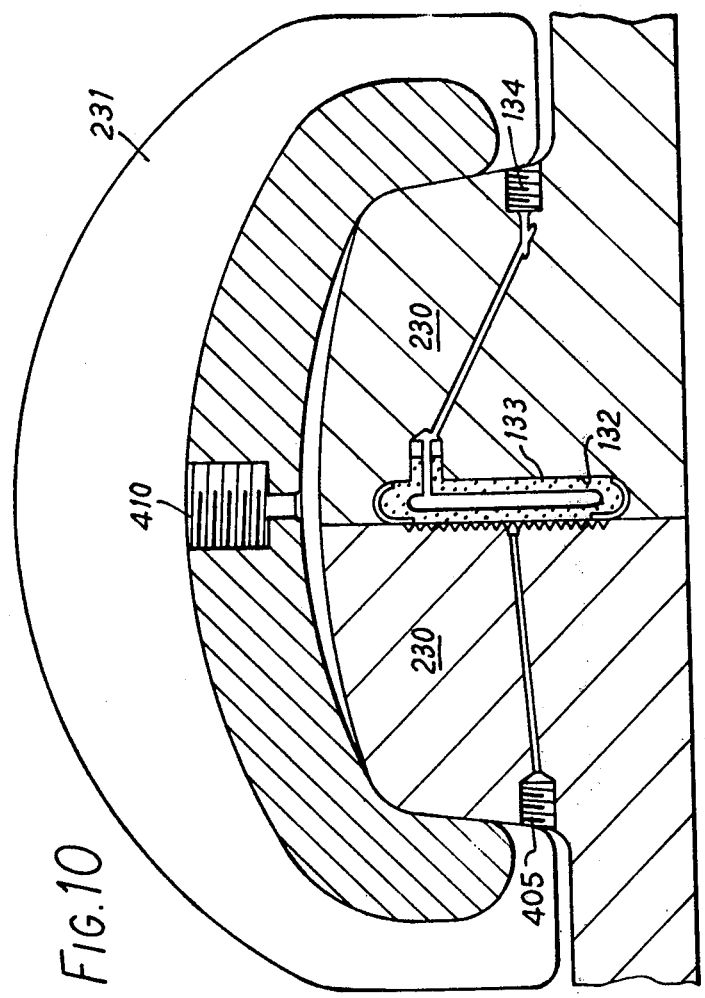
FIG. 10 shows an enlarged fragmentary longitudinal section of the coupling collar on the coupling sleeve.

As can be seen from FIG. 10 the abutting faces of the flanges 230 include a face seal similar to the face seal shown in FIG. 4.

Figure 12:
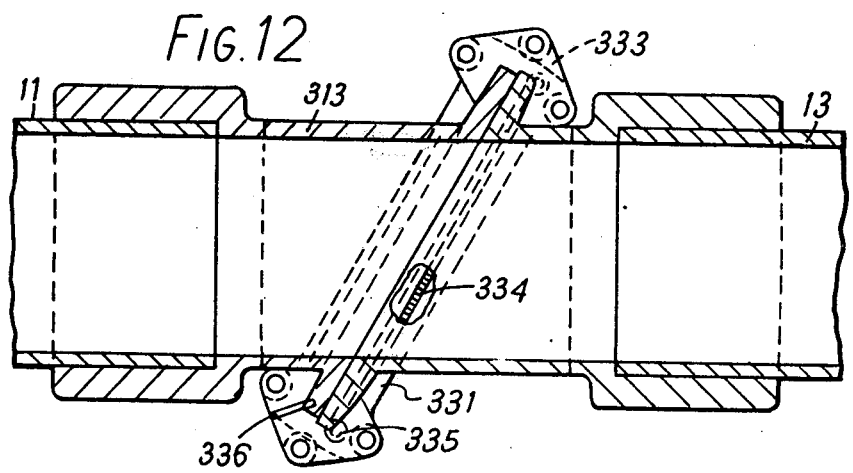
FIG. 12 shows a cross-section of a fourth embodiment of coupling sleeve according to the invention joining the ends of two pipes.
Figure 13:
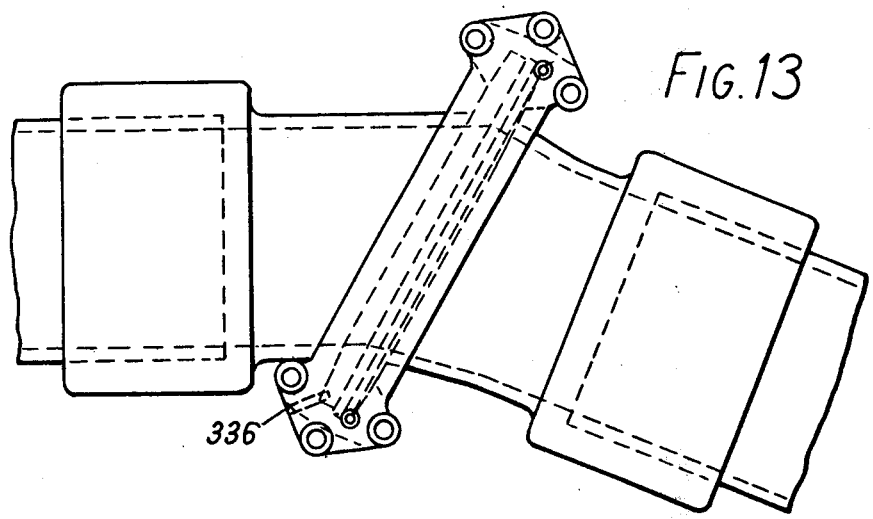
FIG. 13 shows the coupling sleeve of FIG. 12 with the parts of the sleeve rotated relative to one another.

FIGS. 12 and 13 show yet another coupling according to the invention. The arrangement for sealing and gripping each sleeve 313 to the ends of the pipes 11 and 12 is similar to that shown in connection with FIGS. 1 and 4. The joint between the two sleeves 313 is scarfed and the abutting ends of the sleeves have stub flanges 330 which are held together by two segments 331 of the collar. The segments have bolting flanges 333 which are secured together using hydraulic bolts.

To accommodate malalignment between pipe ends the scarfed faces can be rotated relative to one another. To assist in producing this relative rotation, the edge of one flange is machined with worm teeth 334 to engage a pair of worms 335 carried by the collar. The worms 335 may be driven by air or hydraulic motors. The other flange of the pair is pinned to the collar by a pin 336.

Figure 14:
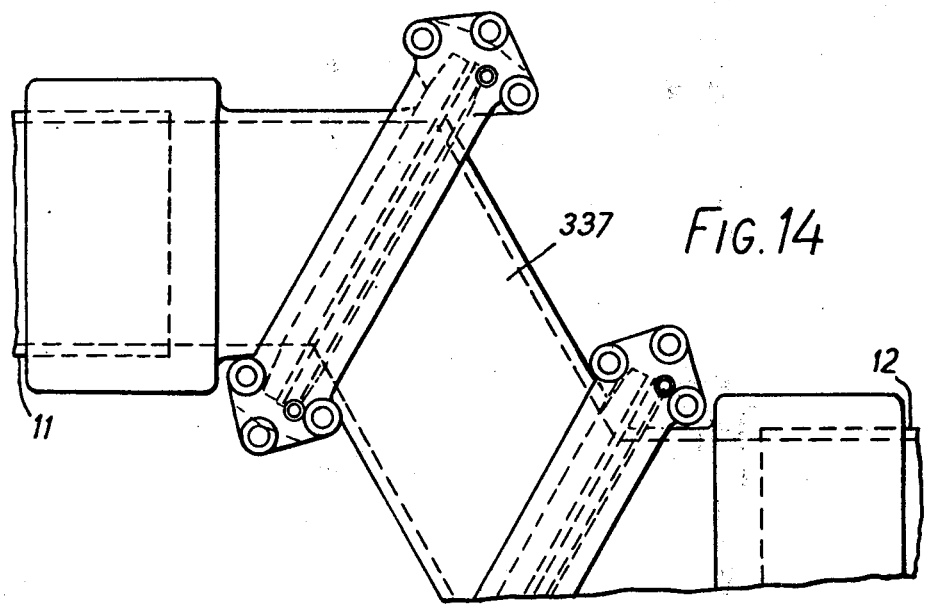
FIG. 14 shows how the sleeve of FIGS. 12 and 13 may be used to connect two parallel pipes out of alignment.

As can be seen in FIG. 14 a displacement of the axis of the pipes 11 and 12 can be accommodated by the use of a bobbin tube 337 and two collars.

Prior to assembly of the pipe couplings described above each coupling should be tested. The coupling sleeves are threaded over a test pipe at the works and the following test procedure is carried out just before despatch to the site where the coupling is to be used. The annular tyres 17 are pressurised with oil to 2,000 psi which centralizes the coupling sleeve on the pipe. A 100 psi air test is applied to the test space 400 between the grooves 14 and 15 through the bore 401 and spaced between the grooves 14 and 16 through the bore 402. If a leak is shown up the cause will most probably be sand or other foreign matter lodged under the seals. The following pressure test procedure will show which of the three seals is leaking. If pressure is applied at the bore 402 and it is not held but it drops and shows no pressure rise at bore 401 then the seal in groove 16 is leaking. By pressurizing through bore 401, if the pressure at bore 402 increases then this confirms that the seal in groove 14 is leaking. If however there is no pressure rise at bore 402 then it is the seal in groove 15 that is leaking.

Before the seals are dismantled to see if they are faulty the pressure in the tires 17 should be reduced to 100 psi and clean sea water or solvent is injected through the bores 401 402. The pressure test is then repeated and if it is still leaking the seal must be moved axially so that the location of the seal on the pipe surface can be inspected. If nothing is found then the seal must be removed and the defective seal replaced by a new seal. If care is taken that the surface of the pipe is satisfactory and clean sea water is injected through the bores 401 and 402 to wash out any sand collected in these spaces during assembly it is most unlikely that there will be any difficulty when the pipe joint is assembled. The second sleeve is then slid onto the test pipe and the coupling rotated to match up with the flange of the first coupling. Pressurization and air testing of the second sleeve on the pipe is carried out in the same way as with the first sleeve. The pressure is then reduced to atmosphere.

In the case of the embodiment of FIG. 7 the collar 231 is then lowered into position over the flanges 230. The hydraulic actuator 235 is pressurized to close the clamp ring and cause the interleaving dogs 234 to engage enabling the taper plug 232 to be inserted and rotated into the correct position by passing over a locating dowel pin 404. Both the tapered plug and the hinge pin 239 are pressurized with oil at 2,000 psi causing the collar to engage the stub flanges 230 firmly. Isolating valves are used to lock in the pressure. The face seal provided by the tire 133 is now tested. The tyre 133 is pressurized to 2,000 psi through the bore 134 and air at 100 psi is applied through a bore 405 to the face opposite the tire 133. No air leakage should occur if the face seal is new and undamaged. The air and oil pressures are then returned to atmospheric.

As a final test the tapered plug 232 and the hinge pin 239 are pressurized to 1,000 psi and the tyres 17 and 133 are pressurized to 2,000 psi. The air tests at 401, 402 and 405 are then repeated.

The pipe joint is then assembled as follows. If there is a leak or rupture in a sub sea pipeline, the faulty section which may be 10' on either side of the damaged part is cut out using standard scarf or inclined cuts and the damaged piece is removed after measurements of the spring and the cuts have been made. The damaged piece plus the gap measurements are used to manufacture and replacement pipe. The sleeves are threadeed over the upstream and downstream open ends of the pipeline. The replacement section of pipe complete with the sleeves slipped over its ends is lowered into position and lined up so that the pipe edges are parallel and the gap split between both ends. If there is some spring or lack of alignment between the upstream and downstream ends of the pipes then the necessary rotational adjustment must be made to bring the coupling faces true and fair. The hinged collar is then lowered into place and secured with the tapered plug. The dowel is then pressurised to 2,000 psi and the isolating valves are closed. The face seal provided by tire 133 is then pressurized to 2,000 psi and the joint between the flanges is air tested by applying air at 100 psi through the bore 405. The coupling sleeves are similarly pressurized with oil and the seals air tested as before. All pressures are then bled away. The assembly is now ready for permanent setting.

The hydraulic taper plug 232 and the hinge pin 239 are pressurized to 2,000 psi with epoxy resin composition and the pressure is locked in using a valve. The pressure seals provided by the tires 17 and the tire 133 are bled off and the oil is blown down by air. A metering mixing and pressure delivery pump for epoxy resin compound is connected to the bore 134 which is injected with epoxy compound, air being bled off and the tire 133 being pressurized to 2,000 psi for 10 minutes before the bore 134 is closed. Epoxy resin compound is injected into the tires 17 and the helical tube 25 through the manifold 21, the air being bled off through the air bleed valves and the pressure being raised to b 2,000 psi for 10 minutes before the inlet bores are closed. Finally the helical space between the jaw sectors is injected with epoxy resin, air being bled off and pressurized to 5,000 psi to seal off the interface.

Air tests at 401, 402 and 405 are finally applied to check that everthing is in order.

If it is acceptable that the epoxy metering, mixing and pressure injection pump may be clamped to each coupling sleeve — i.e., be a part of the coupling sleeve then it is a practical matter to fully automate the epoxy injection procedure. The same pump will be used with local controls to do the pressurization with oil for the proving tests with oil before final pressurization with epoxy compound. It could be that experience will determine that this precaution is not necessary and that air tests carried out after the pressurization with epoxy compound will always show a satisfactory end result.

The pump will operate on a 100 psi air supply which could be an air bottle and regulator.

A supply of epoxy resin and hardner and oil — where required would be secured to the top or alongside the pump unit.

Figure 11:
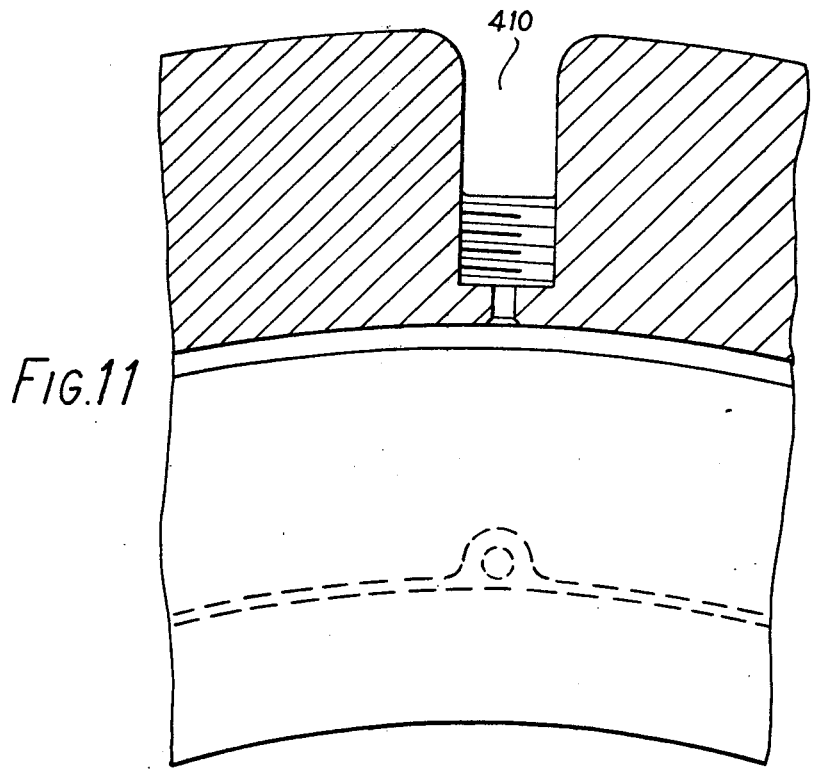
FIG. 11 shows an enlarged fragmentary cross-section of the coupling collar on the coupling sleeve.

The joint is designed as a permanent fixture. Where a demountable connected is reguired between coupling halves a bolted connection may be used. If due to damage or displacement, the face seal provided by tire 133 requires renewal, arrangements have been made in the design to enable the hinged clamp ring to be quickly removed by breaking it away using a weak explosive. A screwed connection for the "gun" is shown as 410 in FIG. 10 and FIG. 11 where the section of hinged clamp ring has been reduced to enforce a sudden break at this point. If the damage is serious, the pipe — which is the weaker member would have been damaged beyond repair and the complete joint would require to be remade with a new make-up section of pipe.

I claim:

1. A pipe coupling comprising:
   a sleeve formed in two parts separated along a longitudinal plane through the axis of the sleeve and including means for securing the two parts together;
   means associated with the sleeve for sealing the sleeve against the pipe, said sealing means comprising an annular groove, an annular tire in said groove, and bores in the wall of the sleeve through which the interior of the annular tire communicates with the exterior;
   gripping means associated with the sleeve for gripping the pipe, said gripping means comprising arcuate groove sections on the inside of the sleeve and formed by a continuous sinuous groove with groove sections extending from one longitudinal edge of each part of the sleeve to the other, the groove sections being connected alternately at opposite longitudinal edges by semi-circular sections, jaw sectors with gripping teeth acommmodated in the arcuate groove section, a tubular member or members located in the groove sections behind the jaw sectors, the tubular member being formed as a continuous tube in each part of the sleeve, and bores extending through the wall of the sleeve through which the interior of the tubular member communicates with the exterior;
   whereby the annular tire and the tubular member or members can be filled through the bores with a hardenable composition and maintained under pressure until set to force the sealing member into sealing contact against the outer surface of the pipe and to cause the gripping teeth of the jaw sectors to bite into the outer surface of the pipe.

2. A pipe coupling comprising:
   a sleeve for fitting over the end of a pipe section;
   means associated with the sleeve for sealing the sleeve against the pipe, said sealing means comprising an annular groove, an annular tire in said groove, and first bores in the wall of the sleeve through which the interior of the annular tire communicates with the exterior;
   gripping means associated with the sleeve for gripping the pipe, said gripping means comprising a series of axially spaced circumferentially extending arcuate groove sections on the inside of said sleeve, jaw sectors with gripping teeth provided along a length of the sleeve, said jaw sectors being accommodated in the series of axially spaced circumferentially extending arcuate groove sections which are joined together to form a continuous channel, a tubular member or members located in the groove sections behind the jaw sectors and extending along the length of the continuous channel and communicating with the exterior at its ends through second bores in the wall of the sleeve, said second bores extending through the wall of the sleeve through which the interior of the tubular member communicates with the exterior;
   whereby the annular tire can be filled through said first bores with a hardenable composition and maintained under pressure until set to force the annular tire into sealing contact against the outer surface of the pipe and the tubular member or members can be filled through said second bores with a hardenable composition by pumping the composition into one end and exhausting air at the other end and maintained under pressure until set to cause the gripping teeth of the jaw sectors to bite into the outer surface of the pipe.

3. A pipe coupling according to claim 2 wherein said circumferentially extending arcuate groove sections are joined together to form a continuous sinuous channel.

4. A pipe coupling according to claim 2 wherein the arcuate groove sections are joined to form a continuous helical channel.

5. A pipe coupling according to claim 2 wherein the sleeve is divided diametrically to form two half sleeves and the groove sections are joined to form two continuous sinuous channels, one in each half sleeve.

6. A pipe coupling comprising:
   a sleeve for fitting over the end of a pipe section, the sleeve being formed as a single piece and encircling the pipe;
   means associated with the sleeve for sealing the sleeve against the pipe, said sealing means comprising an annular groove; an annular hollow tire in said groove, and bores in the wall of the sleeve through which the interior of the annular tire communicates with the exterior;
   gripping means associated with the sleeve for gripping the pipe, said gripping means comprising a helical groove on the inside of said sleeve, a plurality of jaw sectors with gripping teeth accommodated in the helical groove, a helical tubular member located in the groove behind the jaw sectors, and bores extending through the wall of the sleeve through which the interior of the tubular member communicates with the exterior;

whereby a hardenable composition can be introduced into the annular tire and the tubular member through certain of the bores and the interior of the tire and the tubular member purged through others of said bores, and the composition maintained under pressure until set to force the sealing member into sealing contact against the outer surface of the pipe and to cause the gripping teeth of the jaw sectors to bite into the outer surface of the pipe.

* * * * *